United States Patent [19]
Jung et al.

[11] Patent Number: 5,646,234
[45] Date of Patent: Jul. 8, 1997

[54] PRODUCTION OF FIBERS OR FILMS USING SPECIFIC FORMING SOLUTIONS AND THE FIBERS OF FILMS OBTAINABLE THEREBY

[75] Inventors: Holger Jung, Niedernhausen; Richard Neuert, Winkelhaid; Peter Klein, Wiesbaden; Georg-Emerich Miess, Regensburg, all of Germany

[73] Assignee: Hoechst AG, Frankfurt, Germany

[21] Appl. No.: 416,148

[22] Filed: Apr. 4, 1995

[30] Foreign Application Priority Data

Apr. 6, 1994 [DE] Germany ............ 44 11 755.8

[51] Int. Cl.$^6$ ............................................. C08G 69/12
[52] U.S. Cl. ............ 528/184; 528/183; 528/190; 528/191; 528/310; 528/329.1; 528/331; 528/340; 528/344; 428/395; 428/396; 428/474.4; 264/165; 264/177.7; 264/177.13
[58] Field of Search ............... 528/183, 184, 528/190, 191, 310, 329.1, 331, 340, 344; 428/395, 396, 474.5; 264/165, 177.1, 177.13

[56] References Cited

U.S. PATENT DOCUMENTS

| | | |
|---|---|---|
| 3,767,609 | 10/1973 | Gabler et al. . |
| 3,963,664 | 6/1976 | Ozawa et al. . |
| 5,266,672 | 11/1993 | Miess et al. ............ 528/184 |

FOREIGN PATENT DOCUMENTS

| | | |
|---|---|---|
| 0522418 | 1/1993 | European Pat. Off. . |
| 2204075 | 10/1972 | Germany . |
| 2225735 | 7/1976 | Germany . |
| 2211241 | 2/1979 | Germany . |
| 1381181 | 1/1975 | United Kingdom . |

*Primary Examiner*—Samuel A. Acquah
*Assistant Examiner*—P. Hampton-Hightower
*Attorney, Agent, or Firm*—Connolly & Hutz

[57] ABSTRACT

A process for producing fibers or films by the steps of:

a) preparing an aromatic polyamide by polycondensation of dicarbonyl dihalides or mixtures thereof with at least two diamines in N-alkyllactams as a solvent, the polycondensation being of at least 90 mol %, based on the total amount of dicarbonyl dihalides in the reaction mixture, of compounds of the formula I or mixtures of such compounds $$Hal—OC—Ar^1—CO—Hal \quad (I)$$

with at least 90 mol%, based on the total amount of diamines in the reaction mixture, of compounds of the formula II and optionally III or mixtures of such compounds $$H_2N—Ar^2—NH_2 \ (II), \ H_2N—Ar^3—NH_2 \ (III)$$

where $Ar^1$, $Ar^2$ and $Ar^3$ are independently of each other a bivalent aromatic radical, the proportion of structural repeat units in the aromatic polyamide derived from the compounds of the formula II, based on the proportion of the structural repeat units derived from the compounds of the formulae II and III, being at least 50 mol %, and said aromatic polyamide is soluble in organic solvents, b) forcing the solution of the aromatic polyamide obtained in step a) through dies of the desired cross-sectional shape at temperatures from 40° to 120° C. to form fibers or films, c) removing the organic solvent in a conventional manner to produce solvent-leaner or -free fibers or films sufficiently mechanically stable and nontacky for further processing.

The process of the invention omits the customary neutralization after the aromatic polyamide has been prepared.

21 Claims, No Drawings

PRODUCTION OF FIBERS OR FILMS USING SPECIFIC FORMING SOLUTIONS AND THE FIBERS OF FILMS OBTAINABLE THEREBY

BACKGROUND OF THE INVENTION

1. Field of the Invention

The present invention relates to a process for producing formed structures using specific forming solutions comprising aromatic polyamides.

2. Description of the Related Art

Aromatic polyamides—also known as aramids—are known fiber-forming materials of high chemical resistance. Aramid fibers are notable in particular for good mechanical properties, such as high strengths and moduli.

Aramids are usually produced by solution polycondensation of dichlorides of aromatic dicarboxylic acids with aromatic diamines and either formed directly from the solution or precipitated from the solution and converted by renewed dissolving in a suitable solvent into a forming solution. The polycondensation gives rise to hydrogen chloride, which is unwelcome in the forming stage and is usually bound by neutralizing the reaction solution with a base. Usually the forming solution has salts for enhancing the solubility of the aramid added to it or such salts are formed as a consequence of the neutralization of the reaction solution.

It has also already been attempted to produce formed aromatic polyamide structures from salt-free forming solutions.

For instance, DE-B-2,204,075 describes forming solutions which consist of an aromatic polyamide consisting mainly of meta units and a specific N-alkyllactam as solvent.

Furthermore, DE-B-2,225,735 describes a process for preparing homogeneous forming solutions wherein an aromatic polyamide consisting of mainly meta units is suspended in N-methylpyrrolidone (NMP) in the absence of salts within a certain temperature range and dissolved in the NMA by heating to a certain temperature range. EP-A-522,418 discloses a process for producing solvent-spun aramid fibers. The processes for which concrete descriptions are given involve the use of forming solutions which are obtained by polycondensation of monomers to give the aramid and subsequent addition of neutralizing agent. These forming solutions are then directly spun.

There continues to be a need for processes for producing formed structures wherein forming solutions can be used in forming processes directly and without further process measures following the polycondensation of the aramid.

It has now been found that certain para-aramids can be polycondensed in specific solvents and directly converted into formed structures without a neutralization step. This omission of the neutralization step means an appreciable facilitation of process management, since a process stage can be dispensed with. It was further found that unneutralized solutions of certain para-aramids in certain solvents are stable over certain temperature ranges and that these solutions have significantly better filtering properties than corresponding neutralized solutions.

DESCRIPTION OF THE PREFERRED EMBODIMENTS

The present invention accordingly provides a process for producing fibers or films, comprising the following measures:

a) preparing an aromatic polyamide by polycondensation of dicarbonyl dihalides or mixtures thereof with at least two diamines in N-alkyllactams or in particular in N-methylpyrrolidone as solvent, optionally in the presence of a salt for enhancing the solubility of the aromatic polyamide in said solvent, the polycondensation being of at least 90 mol%, based on the total amount of dicarbonyl dihalides in the reaction mixture, of compounds of the formula I or mixtures of such compounds

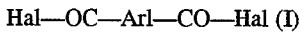
Hal—OC—Arl—CO—Hal (I)

with at least 90 mol%, based on the total amount of diamines in the reaction mixture, of compounds of the formula II and optionally III or mixtures of such compounds

$H_2N$—$Ar^2$—$NH_2$ (II), $H_2N$—$Ar^3$—$NH_2$ (III)

where $Ar^1$ and $Ar^2$ are independently of each other a bivalent aromatic radical whose free valences are disposed para or comparably parallel or coaxial to each other, and $Ar^3$ is a bivalent aromatic radical whose free valences are disposed meta or comparably angled to each other, the proportion of structural repeat units in the aromatic polyamide derived from the compounds of the formula II, based on the proportion of the structural repeat units derived from the compounds of the formulae II and III, being at least 50 mol%, and the respective monomer units underlying the polymer being selected so as to produce an aromatic polyamide which is soluble in organic solvents, b) optionally storing the reaction solution obtained in step a) at temperatures from 40° to 100° C., especially from 60° to 70° C., c) forcing the solution of the aromatic polyamide obtained in step a) and optionally stored as per step b) through dies of the desired cross-sectional shape at temperatures from 40° to 120° C. to form fibers or films, d) removing the organic solvent in a conventional manner to produce solvent-leaner or -free fibers or films sufficiently mechanically stable and nontacky for further processing, and e) optionally drawing the resulting fibers or films in a conventional manner.

The term "fiber" as used herein is to be understood in its widest sense; it thus comprehends for example, continuous filament fibers, such as mono- or multifilaments, or staple fibers or pulp.

The term "film" as used herein is likewise to be understood in its broadest sense; it thus comprehends for example embodiments of very different thickness or function, such as membranes, coatings or in particular sheets.

The aromatic polyamide to be used according to the present invention is a polymer which is chiefly composed of bivalent aromatic para monomers and/or bivalent aromatic monomers whose free valences are disposed to each other in a position which is comparably parallel or coaxial to the para position.

These aromatic polyamides are compounds which are soluble in organic aprotic solvents. A soluble aromatic polyamide for the purposes of this invention is an aromatic polyamide which has a solubility in N-methylpyrrolidone of at least 40 g/l at 25° C.

The aromatic polyamides to be used according to the present invention are prepared by solution polycondensation in N-alkyllactams or preferably in N-methyl-pyrrolidone as solvent. It is also possible to use mixtures of these solvents.

An N-alkyllactam for the purposes of this invention is preferably a compound of the following formula:

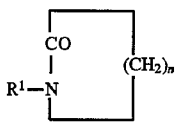

where $R^1$ is a $C_1$–$C_4$-alkyl radical, especially methyl, and n is an integer from 5 to 7 and where the hydrogen atoms of the methylene groups of can have been wholly or partly replaced by $C_1$–$C_4$-alkyl radicals.

In a preferred form of carrying out the solution polycondensation, the aromatic monomeric diamines are dissolved in the particular solvent. The solution thus obtained is then mixed with at least one aromatic monomeric compound in the form of an aromatic dicarbonyl dihalide, preferably by vigorous stirring, to initiate the polycondensation.

In effect the amide solvent is used not only as solvent for the aromatic monomeric compounds and the aromatic copolyamide obtained therefrom but also as acid acceptor for a hydrogen halide, for example for hydrogen chloride, which is formed as a byproduct of the copolymerization of the aromatic monomeric compounds. In some cases it can be advantageous to use a solubility-promoting additive, for example a metal halide of one of the metals of group I or II of the periodic table, which is added to the polycondensation mixture during or after but in particular before the polycondensation.

Examples of such additives are alkali metal halides, such as lithium chloride, or alkaline earth metal halides, such as calcium chloride or magnesium bromide. The amount of such additives is usually 0.2 and 10%, preferably between 0.5 and 5%, based on the total weight of the forming solution.

Very particular preference is given to using in the process of the invention a forming solution containing no additives for promoting the solubility of the aromatic polyamide.

The polycondensation temperatures of the solution polymerization are customarily between –20° C. and +120° C., preferably between +10° C. and +100° C. Particularly good results are obtained at reaction temperatures of between +10° C. and +80° C.

The sum of the concentrations of the aromatic monomeric compounds in the polycondensation mixture solution can be adjusted having regard to the desired degree of polycondensation, the viscosity desired for the polycondensation mixture, the nature of the aromatic monomeric compounds used, the nature of the solvent used and the desired polycondensation temperature. The most favorable sum of the concentrations can be determined on the basis of a number of preliminary experiments into the progress of the polycondensation.

Polycondensation reactions are preferably carried out so that, on completion of the reaction, from 2 to 15, preferably from 5 to 10, % by weight of polycondensate are present in the solution.

As the polycondensation proceeds, the molecular weight of the polymer increases, as does the viscosity of the reaction batch.

An adequate molecular chain length will have been achieved for example when the viscosity of the polymer solution obtained in the course of the polycondensation corresponds to an inherent viscosity of the polymer of more than 3.0 dl/g, preferably more than 5.0 dl/g, in particular 4.5 to 7.0 dl/g.

The inherent viscosity is defined by the expression $$\eta_{inh} = \frac{\ln \eta_{rel}}{c}$$

where $\eta_{rel}$ is the relative viscosity and c the concentration in g/100 ml.

For the purposes of the present invention, the inherent viscosity is determined on 0.25% strength solutions of the polymer in N-methylpyrrolidone at 25° C.

Once the polymer solution has achieved the viscosity required for further processing, the polycondensation can be stopped in a conventional manner by addition of monofunctional compounds, for example acetyl chloride. Preferably the polymer solution is further processed without addition of monofunctional compounds.

It was surprisingly found that the polymer solution obtained is stable and storable within a certain temperature range and that this solution is formable within this temperature range without neutralization of the hydrogen halide formed.

The invention also provides the forming solution prepared by the above-described process.

The forming solution of the present invention is preferably prepared using the above-described aromatic polyamides which have a weight average molecular weight $M_w$ of 80,000 to 160,000, in particular 120,000 to 140,000, and a ratio of the weight average molecular weight to the number average molecular weight $M_w/M_n$ of less than 4.0, in particular 2.0 to 2.5. For this the molecular weight is determined by gel permeation chromatography in N-methylpyrrolidone at 50° C. (reference light scattering).

In contradistinction to the hitherto customary processes for forming the aramids to be used according to the present invention from solvents, the process of the present invention thus involves no neutralization of the hydrogen halide formed, and bound saltlike to the amide solvent, through the addition of basic substances, such as lithiumhydroxide, calciumhydroxide or calcium oxide.

In the process of the present invention, the aramid, being highly soluble in the solvent for the polycondensation, remains completely dissolved therein. For this reason the mixture obtained in the course of the polycondensation is used directly as forming solution for the production of fibers or films.

After the polycondensation, the reaction solution can be used directly as forming solution. Preferably the reaction solution is filtered before further use in order that any coarse and/or gel particles of the aramid still present may be removed. It was surprisingly found that the filtration times of the forming solution to be used according to the invention are distinctly shorter than the filtration times of neutralized solutions.

The forming of the forming solution, preferably the spinning of a spinning solution, by the process of the present invention can be carried out according to any suitable dry process, wet process or dry-wet process. In those cases where a wet process is used the forming solution is extruded through a forming die into a coagulating liquid. It is usually advantageous here for the coagulation liquid to consist of water or of a water-containing solution of a polar aprotic organic solvent.

This polar aprotic organic solvent can he selected from among the same amide solvents as usually used for dissolving the aromatic polyamide.

The polar aprotic organic solvent in the coagulation liquid is preferably the same solvent as present in the forming solution. The coagulation liquid is preferably used at a temperature of between 0° C. and the boiling point of the coagulation liquid at atmospheric pressure.

The polar aprotic organic solvent is preferably present in the coagulation liquid in a concentration between 70% by weight and less, in particular less than 50% by weight.

In the production of films or fibers from the aromatic polyamide, the forming solution is extruded through a die head having one or more forming orifices, and the filament- or film-shaped streams of the forming solution are consolidated in one of the above-indicated coagulation liquids (wet process) or in an atmosphere which promotes evaporation (dry process). A similarly suitable variant is the dry jet wet spinning process as described for example in US-A-3,414,645.

The extruding of the forming solution takes place in the temperature range from 40° to 120° C., preferably 60° to 110° C.

For spinning it is possible to use a customary horizontal or vertical wet spinning machine, a dry jet wet spinning machine, or a spinning machine in which the material flows downward under tension. When choosing the materials of construction for the parts of the forming apparatus which come into contact with the forming solution care must be taken to minimize corrosion.

The size of the die holes of the spinning die or spinnerette is to be chosen so that a film having the desired basis weight or a filament having the desired linear density is obtained.

It is customary to use spinnerettes having hole diameters from 0.05 to 1.0 mm. These spinnerettes can have individual holes (production of monofilaments) or else a plurality of holes (production of multifilaments).

Step d) can involve evaporating the solvent using elevated temperature to produce a solvent-leaner formed structure which is sufficiently mechanically stable and nontacky for further processing (dry forming process).

Preferably, step d) involves introducing the primary formed structure into a bath containing a coagulation liquid so that the organic solvent is removed from said primary formed structure and coagulation of the primary structure results in the formation of the desired formed structure which is of sufficient mechanical stability for further processing (wet forming process).

The introducing can be by direct extrusion into a coagulation liquid or by extrusion into a coagulation liquid after passing through an air gap of predetermined length.

In the wet forming of an aromatic polyamide according to the present invention, the coagulation preferably takes place using a coagulation liquid containing a coagulation-promoting additive, and this coagulation is followed by a further coagulation step in the course of which the coagulating films or filaments of the aromatic polyamide are passed to a water bath which is maintained at a temperature between 0° and 100° C.

The additional coagulation step serves to complete the coagulation by removing the solvent. In addition, coagulation-promoting additives, if used, are washed out of the coagulated films or filaments.

It is clear from the aforegoing description that the process of the present invention can be carried out using customary forming apparatus without a hazardous or harmful solvent, for example concentrated sulfuric acid, having to be used. This reduces the risks to the operating personnel.

The films or filaments produced according to the present invention are usually subjected to an orienting process which serves to enhance not only the mechanical properties, for example the tensile strength and the modulus of elasticity, but also the thermal properties, for example the thermal stability, of the fibers thus produced.

Filaments are generally oriented/drawn to achieve a high mechanical strength and a high modulus of elasticity. The drawn ratio is usually within the range from about 1:6 to 1:20. The drawing temperature is generally between 250° and 550° C., preferably between 300° and 480° C.

The drawing can be carried out in a single step, in two steps or in more steps, in which case a hotplate or a cylindrical heater can be used for the heating. In addition, the drawn filaments can be subjected to a further heat treatment at the same or a higher temperature in order to enhance their crystalline structure.

A conventional drawing finish can be used in the process of the present invention.

It has turned out that the aromatic polyamide films or fibers obtained according to the present invention have a surprisingly low content of calcium or lithium ions, especially when the process is carried out in the absence of any solubilizers, such as calcium chloride or lithium chloride.

The present invention therefore also provides fibers and films of aromatic polyamides which are soluble in organic solvents and which contain at least 90 mol%, based on the aromatic polyamide, of structural repeat units of the formula VIII or of the formulae VIII and IX —OC—Ar$^1$—CO—NH—Ar$^2$—NH— (VIII),
—OC—Ar$^1$—CO—NH—Ar$^3$—NH— (IX)

where Ar$^1$, Ar$^2$ and Ar$^3$ are each as defined above, said fibers or films having a content of calcium compounds or of lithium compounds or of calcium and lithium compounds of in each case below 100 ppm, based on the dry substance of the aromatic polyamide.

The determination of the content of calcium or lithium compounds can be carried out by arc emission spectroscopy or else optionally by the method of x-ray fluorescence spectroscopy.

The process of the present invention is preferably carried out using aromatic polyamides obtainable by polycondensation of dicarbonyl dihalides of the above-defined formula I or of mixtures of such compounds with aromatic diamines of the formulae IV and VII or IV and V or IV, V and VI or IV and VII or IV, IV and VII

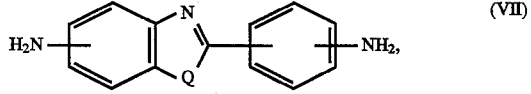

where Ar$^4$ is a bivalent aromatic radical whose free valences are disposed para or comparably parallel or coaxial to each other, in particular an aromatic monocyclic or fused bicyclic radical, Ar$^5$ and Ar$^6$ are independently of each other a bivalent aromatic radical whose free valences are disposed para or comparably parallel or coaxial to each other, or where Ar$^6$ additionally is a bivalent aromatic radical whose free valences are disposed meta or comparably angled to each other, X is a direct C—C bond or a group of the formula —O—, —S—, —SO$_2$—, —O-phenylene-O— or alkylene, Ar$^7$ and Ar$^8$ each have one of the meanings defined for Ar$^5$ and Ar$^6$, Y has one of the meanings defined for X or can additionally denote a group of the formula —HN—CO—, and Q is a group of the formula —O—, —S— or in particular —NR$^2$— where R$^2$ is alkyl, cycloalkyl, aryl, aralkyl or in particular hydrogen.

The total amount of the respective monomer units underlying the polymer is to be chosen so as to produce an aromatic polyamide which is soluble in organic solvents, preferably with the formation of isotropic solutions.

Any bivalent aromatic radicals whose valence bonds are disposed pard or comparably coaxial or parallel to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be bonded linearly to one another via C—C bonds or via —CO—NH— groups.

The valence bonds in mutually coaxial or parallel disposition point in opposite directions. An example of coaxial bonds pointing in opposite directions are the biphenyl-4,4'-ylene bonds. An example of parallel bonds pointing in opposite directions are the naphthylene-1,5 or -2,6 bonds, whereas the naphthylene-1,8 bonds are parallel but point in the same direction.

Examples of preferred bivalent aromatic radicals whose valence bonds are disposed pard or comparably coaxial or parallel to each other are monocyclic aromatic radicals having free valences disposed pard to each other, especially 1,4-phenylene, or bicyclic fused aromatic radicals having parallel bonds pointing in opposite directions, especially 1,4-, 1,5- and 2,6-naphthylene, or bicyclic aromatic radicals linked by a C—C bond and having coaxial bonds pointing in opposite directions, especially 4,4'-biphenylylene.

Any bivalent aromatic radicals whose valence bonds are disposed meta or comparably angled to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be bonded to one another via C—C bonds or via bridging groups such as —O—, —CH$_2$—, —S—, —CO— or —SO$_2$—.

Examples of preferred bivalent aromatic radicals whose valence bonds are disposed meta or comparably angled to each other are monocyclic aromatic radicals having free valences disposed meta to each other, especially 1,3-phenylene, or bicyclic fused aromatic radicals having mutually kinked bonds, especially 1,6- and 2,7-naphthylene, or bicyclic aromatic radicals linked via a C—C bond but having mutually kinked bonds, especially 3,4'-biphenylylene.

The process of the present invention may utilize not only mixtures of dicarbonyl dihalides of the above-defined formula I but also mixtures of aromatic diamines of the formula II or mixtures of aromatic diamines of the formula III. An example of the use of mixtures of diamines of the formula II is the above-described process wherein diamines of the formulae IV, V and VI are used. In addition to triple mixtures of aromatic diamines, however, it is also possible to use systems with even more diamine components, for example systems based on the use of four or five different aromatic diamines.

Minor portions, for example up to 10 mol%, of the monomer units, based on the polymer, can be aliphatic or cycloaliphatic in nature, for example alkylene or cycloalkylene units.

Alkylene is to be understood as meaning branched and especially straight-chain alkylene, for example alkylene having two to four carbon atoms, especially ethylene.

Cycloalkylene radicals are for example radicals having five to eight carbon atoms, especially cycloalkylene.

All these aliphatic, cycloaliphatic or aromatic radicals can be substituted by inert groups. These are substituents which have no adverse effect on the contemplated application.

Examples of such substituents are alkyl, alkoxy or halogen.

Alkyl is to be understood as meaning branched and especially straight-chain alkyl, for example alkyl having one to six carbon atoms, especially methyl.

Alkoxy is to be understood as meaning branched and especially straight-chain alkoxy, for example alkoxy having one to six carbon atoms, especially methoxy.

Halogen is for example fluorine, bromine or in particular chlorine.

Preference is given to aromatic polyamides based on unsubstituted radicals.

Ar$^1$, Ar$^2$, Ar$^4$, Ar$^5$, Ar$^6$, Ar$^7$ and Ar$^8$ are each preferably 1,4-phenylene.

Ar$^5$, Ar$^6$, Ar$^7$ and Ar$^8$ may each also be 1,4-phenylene substituted by a radical, such as alkyl, in particular methyl, alkoxy, in particular methoxy or halogen, in particular chlorine, inert toward carbonyl chloride.

Ar$^6$ and Ar$^8$ may each preferably also be 1,3-phenylene.

Ar$^3$ is preferably 3,4'-diaminodiphenyl ether.

X and Y are each preferably —O— or —O-1,4-phenylene-O— or a direct C—C bond.

Q is particularly preferably —NH—.

Examples of preferred diamine combinations underlying the preferred aromatic polyamides comprising the structural repeat units derived from diamines of the formulae IV and VII or IV and V or IV, V and VI or IV, V and VII are 1,4-phenylenediamine, 4,4'-diaminodiphenylmethane and 3,3'-dichloro-, 3,3'-dimethyl- or 3,3'-dimethoxy-benzidine; and also 1,4-phenylenediamine, 1,4-bis(4-aminophenoxy)-benzene and 3,3'-dichloro-, 3,3'-dimethyl- or 3,3'-dimethoxy-benzidine; and also 1,4-phenylenediamine, 3,4'-diaminodiphenyl ether and 3,3'-dichloro-, 3,3'-dimethyl-or 3,3'-dimethoxy-benzidine; and also 1,4-phenylenediamine, 3,4'-diaminodiphenyl ether and 4,4'-diaminobenzanilide; and also 1,4-phenylenediamine, 1,4-bis-(4-aminophenoxy) benzene and 3,4'-diaminodiphenyl ether; and also 1,4-phenylenediamine and diamino-2-phenylbenzimidazole; and also 1,4-phenylenediamine, diamino-2-phenylbenzimidazole and 3,3'-dichloro-, 3,3'-dimethyl- or 3,3'-dimethoxy-benzidine; and also 1,4-phenylenediamine, diamino-2-phenylbenzimidazole and 3,4'-diaminodiphenyl ether; and also 3,3'-dichloro-, 3,3'-dimethyl- or 3,3'-dimethoxy-benzidine, diamino-2-phenylbenzimidazole and 1,4-bis(4-aminophenoxy)benzene; and also diamino-2-phenylbenzimidazole, 3,3'-dichloro-, 3,3'-dimethyl- or 3,3'-dimethoxy-benzidine and 3,4'-diaminodiphenyl ether; and also 1,4-phenylenediamine, diamino-2-phenylbenzimidazole and 1,4-bis(4-aminophenoxy) benzene.

Aramids which are derived from such diamine combinations and which are preferable for use according to the present invention are to some extent described in EP-A-199,090, EP-A-364,891, EP-A-364,892, EP-A-364,893 and EP-A-424,860.

The fibers obtained according to the present invention preferably have filament linear densities from 1 to 50 dtex, in particular from 1 to 30 dtex.

The tensile strength of the fibers obtained according to the present invention is preferably 130 to 290 cN/tex, in particular 190 to 250 cN/tex.

The initial modulus, based on 100% extension, of the fibers obtained according to the present invention is preferably 30 to 80 N/rex.

The cross-sectional shape of the individual filaments of the fibers obtained according to the present invention can be optional, for example triangular, tri- or multilobal or in particular elliptical or round.

The fibers obtained according to the present invention, which have excellent mechanical and thermal properties and are notable for high drawability, can be used industrially in a wide range of ways, for example as reinforcing materials, as for the reinforcement of rubber goods and in particular for the reinforcement of hydraulically setting materials, as heat-resistant insulator materials, for producing filter fabrics and as insulants.

The Examples which follow illustrate the invention without limiting it.

Example 1

Aromatic copolyamide of 100 mol% of terephthalol chloride (TPC), 50 mol% of para-phenylenediamine (PPD), 25 mol% of 1,4-bis(4-aminophenyloxy)benzene (BAPOB) and 25 mol% of 3,4'-diaminodiphenyl ether (DADPE)

162.2 g (1.5 mol) of PPD, 150.2 g (0.75 mol) of DADPE and 219.3 g (0.75 mol) of BAPOB were dissolved under nitrogen in 14042 g of N-methylpyrrolidone (NMP) and admixed at between 35° and 55° C. with 587 g (2.9 mol) of TPC over 20 minutes. The desired viscosity was set by adding the remainder of 10.3 g (0.1 mol) of TPC a little at a time and then amounted to an inherent viscosity of 5.5 dl/g. The solution was without addition of a neutralizing agent, such as calcium oxide, filtered, degassed and wet-spun. For this, it was spun through a spinnerette with 100 holes, each 0.10 mm in diameter, into a coagulation bath consisting of a hot solution of 35% NMP in water at 80° C. at a speed of 16 m/min. The filaments obtained were drawn through two water baths, a washer, over a dry godet and finally over hotplates at temperatures of 400° to 440° C. to an 11-fold multiple.

The filament linear density was 1.8 dtex combined with a tenacity of 195 cN/tex, an elongation of 4.3% and an initial modulus of 43 N/rex, based on 100% extension.

Examples 2 to 15

The preparatory method was followed to prepare further aramids, which were then wet-spun. The chemical composition of the aramids prepared, the production and processing conditions and the properties of the filaments obtained are listed in the table below. The key to the monomers used is as follows:

TPC terephthaloyl chloride
PPD para-phenylenediamine
DADPE 3,4'-diaminodiphenyl ether
BAPOB 1,4-bis(3-aminophenyloxy)benzene
DMB 3,3'-dimethyl-benzidine
DABI 5(6)-amino-2-(p-aminophenyl)benzimidazole

TABLE

| Example | 2 | 3 | 4 | 5 | 6 | 7 | 8 |
|---|---|---|---|---|---|---|---|
| TPC (mol %) | 100 | 100 | 100 | 100 | 100 | 100 | 100 |
| PPD (mol %) | 50 | 45 | 47 | 30 | 20 | 25 | 40 |
| DADPE (mol %) | 35 | 39 | 38 | 10 | 20 | — | — |
| BAPOB (mol %) | 15 | 16 | 15 | — | — | 25 | — |
| DMB (mol %) | — | — | — | 60 | 60 | 50 | — |
| DABI (mol %) | — | — | — | — | — | — | 60 |
| Concentration of spinning solution (% by weight) | 8 | 10 | 10 | 6 | 6 | 6 | 4 |
| Inh. viscosity (dl/g) | 6.0 | 4.7 | 4.25 | 5.4 | 5.7 | 6.8 | 4.3 |
| Tow linear density (dtex) | 1100 | 1108 | 1103 | 180 | 175 | 1100 | 160 |
| Breaking strength (cN/tex) | 260 | 235 | 223 | 175 | 195 | 235 | 1430 |
| Modulus of elasticity (N/tex) | 50 | 47 | 45 | 94 | 79 | 64 | 10514 |
| Breaking extension (%) | 4.5 | 4.2 | 4.1 | 1.8 | 2.3 | 3.4 | 2.1 |
| Draw ratio 1: | 18 | 15 | 12 | 6 | 8 | 13 | 3 |

| Example | 9 | 10 | 11 | 12 | 13 | 14 | 15 |
|---|---|---|---|---|---|---|---|
| TPC (mol %) | 100 | 100 | 100 | 100 | 100 | 100 | 100 |
| PPD (mol %) | 40 | 30 | 30 | — | — | 50 | 25 |
| DADPE (mol %) | 20 | 30 | 10 | — | 20 | — | — |
| BAPOB (mol %) | — | — | — | — | 10 | 25 | 25 |
| DMB (mol %) | — | — | — | 40 | — | — | — |
| DABI (mol %) | 40 | 40 | 60 | 60 | 70 | 25 | 50 |
| Concentration of spinning solution (% by weight) | 6 | 6 | 6 | 5 | 6 | 6 | 6 |
| Inh. viscosity (dl/g) | 5.5 | 5.8 | 5.1 | 4.2 | 5.6 | 6.3 | 6.1 |
| Tow linear density (dtex) |  | 550 | 550 | 550 | 180 | 180 | 180 |
| Breaking strength (cN/tex) | 210 | 250 | 210 | 224 | 210 | 230 | 215 |
| Modulus of elasticity (N/tex) | 85 | 76 | 85 | 99 | 66 | 68 | 50 |
| Breaking extension (%) | 3.4 | 4.5 | 3.8 | 3.5 | 3.9 | 3.4 | 3.9 |
| Draw ratio 1: | 11 | 13 | 8 | 7 | 10 | 7 | 9 |

What is claimed is:

1. A process for producing fibers or films, comprising the following steps:
   a) preparing an aromatic polyamide by polycondensation of dicarbonyl dihalides or mixtures thereof with at least two diamines in N-alkyllactams as solvent, optionally in the presence of a salt for enhancing the solubility of the aromatic polyamide in said solvent, the polycondensation being of at least 90 mol%, based on the total amount of discarbonyl dihalides in the reaction mixture, of compounds of the formula I or mixtures of such compounds Hal—OC—Ar$^1$—CO—Hal (I)

with at least 90 mol%, based on the total amount of diamines in the reaction mixture, of compounds of the formula I and optionally III or mixtures of such compounds $H_2N$—Ar$^2$—$NH_2$ (II), $H_2N$—Ar$^3$—$NH_2$ (III)

where Ar$^1$ and Ar$^2$ are independently of each other a bivalent aromatic radical and Ar$^3$ is a bivalent aromatic radical the proportion of structural repeat units in the aromatic polyamide derived from the compounds of the formula II, based on the proportion of the structural repeat units derived from the compounds of the formula II and III, being at least 50 mol%, and said aromatic polyamide is soluble in organic solvents,
   b) optionally storing the reaction solution obtained in step a) at temperatures from 40° to 100° C.,
   c) forcing the solution of the aromatic polyamide obtained in step a) and optionally stored as per step b) through dies of the desired cross-sectional shape at temperatures from 40° to 120° C. to form fibers or films,
   d) removing the organic solvent to produce solvent-leaner or -free fibers or films sufficiently mechanically stable and nontacky for further processing, and e) optionally drawing the resulting fibers or films and wherein a neutralization step is not carried out after the aromatic polyamide has been prepared.

2. The process of claim 1 wherein the aromatic polyamide has a weight average molecular weight $M_w$ of 80,000 to 160,000 and a ratio of the weight average molecular weight to the number average molecular weight $M_w/M_n$ of not greater than 4.0.

3. The process of claim 1 wherein the preparation of the aromatic polyamide in step a) is effected by dissolving the aromatic monomeric diamines in the particular solvent and subsequently mixing the solution thus obtained with at least one aromatic dicarbonyl dihalide.

4. The process of claim 1 wherein the polycondensation is carried out at temperatures between +10° C. and +80° C.

5. The process of claim 1 wherein step d) is carried out using a forming solution containing no additives for promoting the solubility of the aromatic polyamide.

6. The process of claim 1 wherein step d) is carried out using a forming solution containing 2 to 15% by weight of aromatic polyamide, based on the forming solution.

7. The process of claim 1 wherein step c) is carried out using an aromatic polyamide whose inherent viscosity is 4.5 to 7.0 dl/g.

8. The process of claim 1 wherein $Ar^1$ and $Ar^2$ are each 1,4-phenylene and $Ar^3$ is a bivalent radical of 3,4'-diaminodiphenyl ether.

9. The process of claim 1 wherein the aromatic polyamide used in step c) is a polymer which is obtainable by polycondensation of dicarbonyl dihalides of the formula I as set forth in claim 1 or of mixtures of such compounds with aromatic diamines of the formulae IV and VII or IV and V or IV, V and VI or IV and VII or IV, V and VII $$H_2N-Ar^4-NH_2, \quad (IV)$$

$$H_2N-Ar^5-X-Ar^6-NH_2, \quad (V)$$

$$H_2N-Ar^7-Y-Ar^8-NH_2, \quad (VI)$$

(VII)

$H_2N$—[benzoxazole-phenylene]—$NH_2$, where $Ar^4$ is a bivalent aromatic radical, $Ar^5$ and $Ar^6$ are independently of each other a bivalent aromatic radical, or where $Ar^6$ additionally is a bivalent aromatic radical X is a direct C—C bond or a group of the formula —O—, —S—, —SO$_2$—, —O-phenylene-O— or alkylene, $Ar^7$ and $Ar^8$ each have one of the meanings defined for $Ar^5$ and $Ar^6$, Y has one of the meanings defined for X or can additionally denote a group of the formula —HN—CO—, and Q is a group of the formula —O—, —S— or in particular —NR$^2$— where R$^2$ is alkyl, cycloalkyl, aryl, aralkyl or hydrogen.

10. The process of claim 9 wherein the diamine of the formula IV is derived from 1,4-phenylenediamine, the diamine of the formula V is derived from 4,4'-diaminodiphenylmethane and the diamine of the formula VI is derived from 3,3'-dichloro-, 3,3'-dimethyl- or 3,3'-dimethoxy-benzidine.

11. The process of claim 9 wherein the diamine of the formula IV is derived from 1,4-phenylenediamine, the diamine of the formula V is derived from 1,4-bis(4-aminophenoxy)benzene and the diamine of the formula VI is derived from 3,3'-dichloro-, 3,3'-dimethyl- or 3,3'-dimethoxy-benzidine.

12. The process of claim 9 wherein the diamine of the formula IV is derived from 1,4-phenylenediamine, the diamine of the formula V is derived from 3,4'-diaminodiphenyl ether and the diamine of the formula VI is derived from 3,3'-dichloro-, 3,3'-dimethyl- or 3,3'-dimethoxy-benzidine.

13. The process of claim 9 wherein the diamine of the formula IV is derived from 1,4-phenylenediamine, the diamine of the formula V is derived from 3,4'-diaminodiphenyl ether and the diamine of the formula VI is derived from 4,4'-diaminobenzanilide, or the diamine of the formula IV is derived from 1,4-phenylenediamine, the diamine of the formula V is derived from 1,4-bis(4-aminophenoxy)benzene and the diamine of the formula VI is derived from 3,4'-diaminodiphenyl ether, or the diamine of the formula IV is derived from 1,4-phenylenediamine and the diamine of the formula VII is derived from diamino-2-phenylbenzimidazole, or the diamine of the formula IV is derived from 1,4-phenylenediamine, the diamine of the formula V is derived from 3,3'-dichloro-, 3,3'-dimethyl- or 3,3'-dimethoxy-benzidine and the diamine of the formula VII is derived from diamino-2-phenylbenzimidazole, or the diamine of the formula IV is derived from 1,4-phenylenediamine, the diamine of the formula V is derived from 3,4'-diaminodiphenyl ether and the diamine of the formula VII is derived from diamino-2-phenylbenzimidazole, or the diamine of the formula IV is derived from 3,3'-dichloro-, 3,3'-dimethyl- or 3,3'-dimethoxybenzidine, the diamine of the formula V is derived from 1,4-bis(4-aminophenoxy)benzene and the diamine of the formula VII is derived from diamino-2-phenylbenzimidazole, or the diamine of the formula IV is derived from 3,3'-dichloro-, 3,3'-dimethyl- or 3,3'-dimethoxy-benzidine, the diamine of the formula V is derived from 3,4'-diaminodiphenyl ether and the diamine of the formula VII is derived from diamino-2-phenylbenzimidazole, or the diamine of the formula IV is derived from para-phenylenediamine, the diamine of the formula V is derived from 1,4-bis(4-aminophenoxy)benzene and the diamine of the formula VII is derived from diamino-2-phenylbenzimidazole.

14. A forming solution for preparing fibers or films, obtainable by polycondensation of dicarbonyl dihalides or mixtures thereof with at least two diamines in N-alkyllactams in N-methylpyrrolidone as solvent, to form an aromatic polyamide, optionally in the presence of a salt for enhancing the solubility of the aromatic polyamide in said solvent, the polycondensation being of at least 90 mol%, based on the total amount of dicarbonyl dihalides in the reaction mixture, of compounds of the formula I or mixtures of such compounds $$Hal-OC-Ar^1-CO-Hal \quad (I)$$

with at least 90 mol%, based on the total amount of diamines in the reaction mixture, of compounds of the fomula II and optionally III or mixtures of such compounds $$H_2N-Ar^2-NH_2 \quad (II)$$

$$H_aN-Ar^3-NH_2 \quad (III)$$

where $A^1$ and $A^2$ are independently of each other a bivalent aromatic radical whose free valences are disposed para or comparably parallel or coaxial to each other, and $Ar^3$ is a bivalent monocyclic or polycyclic aromatic radical whose free valences are disposed meta or comparably angled to each other, the proportion of structural repeat units in the aromatic polyamide derived from the compounds of the formula II, based on the proportion of the structural repeat units derived from the compounds of the formulae II and III, being at least 50 mol%, and the respective monomer units underlying the polymer being selected so as to produce an aromatic polyamide which is soluble in organic solvents.

15. Fibers and films of aromatic polyamides which are soluble in organic solvents and which contain at least 90 mol%, based on the aromatic polyamide, of structural repeat units of the formula VIII or of the formulae VIII and IX —OC—Ar$^1$CO—NH—Ar$^2$—NH— (VIII), —OC—Ar$^1$CO—NH—Ar$^3$—NH— (IX)

where Ar$^1$, A$^2$ and A$^3$ are independently of one another a bivalent aromatic radical, said fibers or films having a content of calcium compounds or of lithium compounds or of calcium and lithium compounds of in each case below 100 ppm, based on the dry substance of the aromatic polyamide.

16. The fibers and films of claim 15, wherein the aromatic polyamide is a polymer with structural repeat units of the formulae X and XI

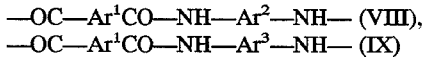

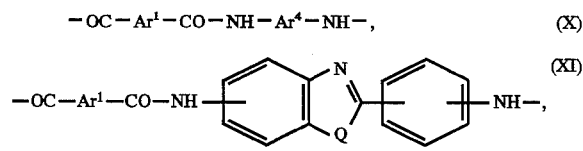

where Ar$^1$ is a bivalent aromatic radical, and Ar$^4$ is a bivalent aromatic radical, and Q is a group of the formula —O—, —S—, NR$^2$— where R$^2$ is alkyl, cycloalkyl, aryl, aralkyl or hydrogen.

17. The fibers and films of claim 15, wherein the aromatic polyamide is a polymer with the structural repeat units of the formulae X and XII —OC—Ar$^1$—CO—NH—Ar$^4$—NH— (X), —OC—Ar$^1$—CO—NH—Ar$^5$—X—Ar$^6$—NH— (XI)

where Ar$^1$ is a bivalent aromatic radical, and Ar$^4$ and Ar$^6$ are independently of one another are a bivalent aromatic radical and X is a direct C—C bond or a group of the formula —O—, —S—, —SO$_2$—, —O—phenylene-O— or alkylene.

18. The fibers and films of claim 15 wherein the aromatic polyamide is a polymer with the structural repeat units of the formulae X, XII and XIII —OC—Ar$^1$—CO—NH—Ar$^4$—NH— (X), —OC—Ar$^1$—CO—NH—Ar$^5$—X—Ar$^6$—NH— (XII), —OC—Ar$^1$—CO—NH—Ar$^7$—X—Ar$^8$—NH— (XIII)

where Ar$^1$ is a bivalent aromatic radical, and Ar$^4$, Ar$^5$, Ar$^6$, Ar$^7$, Ar$^8$, independently of one another are a bivalent aromatic radical, Ar$^7$ and Ar$^8$ each have one of the meanings defined for Ar$^5$ and Ar$^6$, Y has one of the meanings defined for X or can additionally denote a group of the formula —HN—CO—.

19. The fibers and filaments of claim 15, wherein the aromatic polyamide is a polymer with the structural repeat units of the formulae X, XI and XII

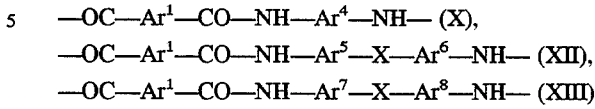

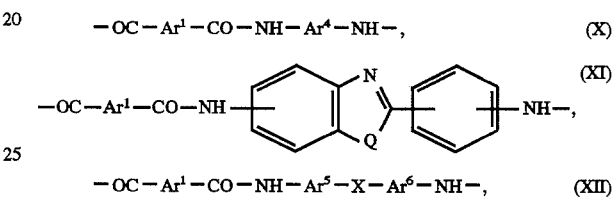

wherein Ar$^1$, A$^4$, Ar$^5$, and Ar$^6$ independently of one another are a bivalent aromatic radical, and X is a direct C—C bond or a group of the formula —O—, —S—, —SO$_2$—, —O-phenylene-O— or alkylene, and O is a group of the formula —O—, —S—, NR$^2$—where R$^2$ is alkyl, cycloalkyl, aryl, aralkyl or hydrogen.

20. The process as claimed in claim 1, wherein step b) is performed at temperatures from 60° to 70° C.

21. The process as claimed in claim 9, wherein Ar$^4$, Ar$^5$, A$^6$, Ar$^7$ and Ar$^8$ are 1,4-phenylene.

* * * * *